United States Patent [19]

Bando

[11] Patent Number: 4,981,373
[45] Date of Patent: Jan. 1, 1991

[54] FIXING STRUCTURE FOR THRUST ROLLER BEARING

[75] Inventor: Mitsuo Bando, Osaka, Japan
[73] Assignee: Koyo Seiko Co., Ltd., Osaka, Japan
[21] Appl. No.: 416,358
[22] Filed: Oct. 3, 1989

Related U.S. Application Data

[63] Continuation-in-part of Ser. No. 219,009, Jul. 14, 1988.

[30] Foreign Application Priority Data

Jul. 17, 1987 [JP] Japan .................. 62-110518

[51] Int. Cl.⁵ ............................................. F16C 19/30
[52] U.S. Cl. ................................. 384/620; 384/622
[58] Field of Search .............................. 384/618–623

[56] References Cited

U.S. PATENT DOCUMENTS

| | | | |
|---|---|---|---|
| Re. 28,431 | 5/1975 | Alling | 384/621 |
| 2,891,828 | 6/1959 | Winchell | 384/621 |
| 3,972,574 | 8/1976 | Pitner | 384/621 |
| 4,042,309 | 8/1977 | Hiraga | 384/621 X |
| 4,310,205 | 1/1982 | Condon, Jr. et al. | 384/620 |
| 4,725,153 | 2/1988 | Tsuruki | 384/620 |
| 4,783,183 | 11/1988 | Gardella | 384/620 |

Primary Examiner—Thomas R. Hannon

[57] ABSTRACT

A structure for fixing a thrust roller bearing interposed between a shaft and a housing rotating relative to one another comprises a race rest, provided on either the shaft or the housing, for supporting the thrust roller bearig in an unmoved state in the axial direction of the shaft and the housing, and a projection provided at the inner side of an inner race of the thrust roller bearing or the outer side of an outer race of the thrust roller bearing. The race rest has a recess by which the projection is locked to prevent the race and the projection from coming off. The recess can be provided generally in the middle of the face of the rest race whereby the inner or outer bearing will contact the face of the rest race in at least two positions to thereby hold the races stably. A spacer can also be provided between the shaft and the race having the projection to reduce the width of the recess whereby different sized thrust roller bearings can be fixed by the structure.

22 Claims, 7 Drawing Sheets axes direction axes direction axes direction axes direction FIG. 12 a
FIG. 12 b
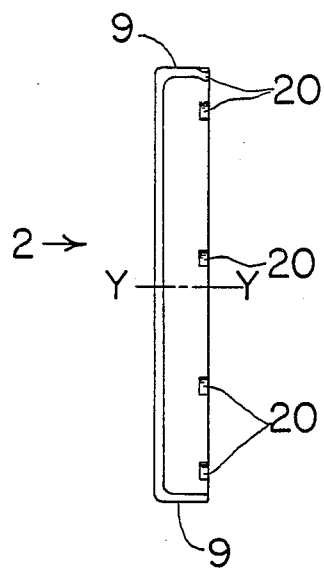
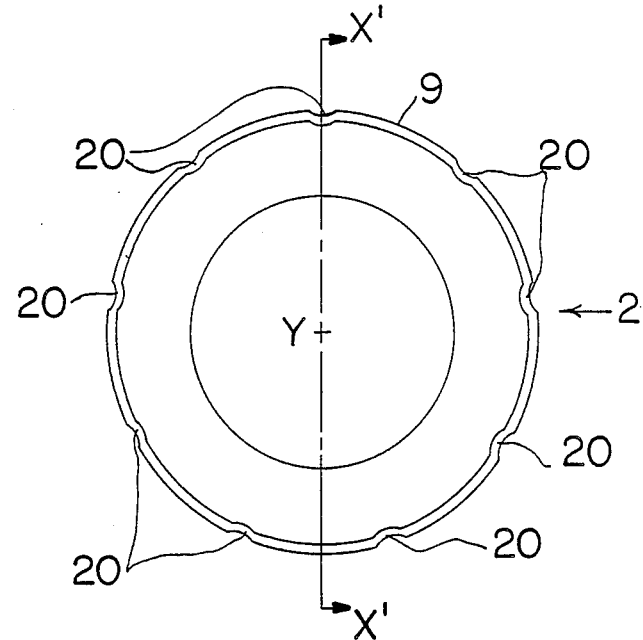
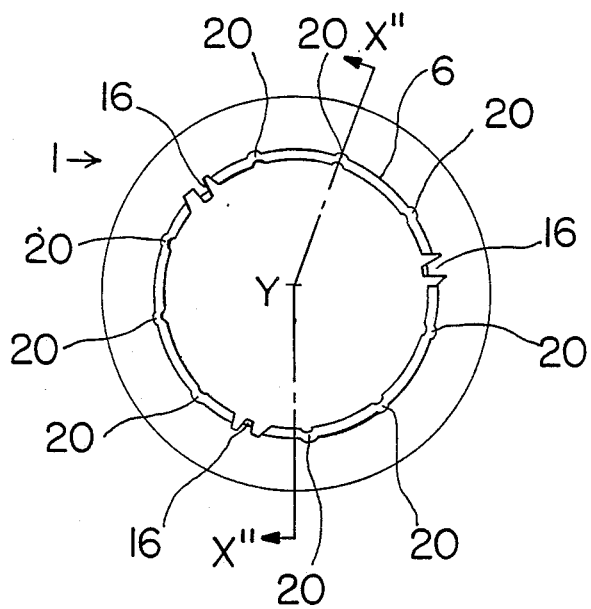
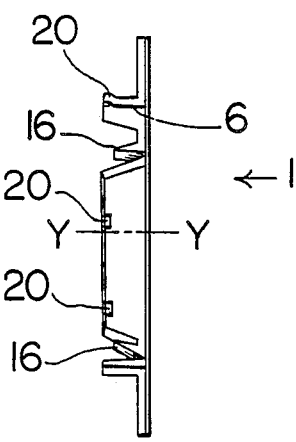
FIG. 13 b
FIG. 13 a

FIXING STRUCTURE FOR THRUST ROLLER BEARING

BACKGROUND OF THE INVENTION

This application is a continuation-in-part of U.S. application Ser. No. 07/219,009, filed July 14, 1988.

FIELD OF THE INVENTION

The present invention relates to a fixing structure for a thrust roller bearing, and, in particular, to a structure for fixing a thrust roller bearing to one of two rotating elements.

DESCRIPTION OF THE BACKGROUND ART

In FIG. 7, a cross-sectional view of a conventional thrust roller tearing showing only the upper parts is illustrated. The thrust roller bearing comprises an inner race 1, an outer race 2, needle rollers 3, and a retainer 4 for keeping the needle rollers 3 positioned for rotation.

The inner race 1 is provided with a race body 5 composed of a circular thin plate, a cylindrical portion 6 extending axially from the inner periphery of the body 5, and a circular projection 7, disposed at the edge of the cylindrical portion 6 and bent radially outwardly, for preventing detachment of the retainer 4. The outer race 2 is provided with a race body 8 composed of a circular thin plate, a cylindrical portion 9 extending axially from the outer periphery of the race body 8, and a circular projection 10, disposed at the edge of the cylindrical portion 9 and bent radially inwardly for preventing detachment of the retainer 4.

The retainer 4 comprises a pair of circular plates 11 and 12 having a cup-shape cross-section. Each of the pair of circular plates 11 and 12 has a plurality of circumferentially separated pockets. Needle rollers 3 are supported in the pockets of the retainer 4. The retainer 4 is interposed between the inner race 1 and the outer race 2, so that the retainer 4 cannot be separated from the inner race 1 and the outer race 2 with the help of the circular projection 7 of the inner race 1 and the circular projection 10 of the outer race 2.

The above-described thrust roller bearing A operates by being interposed between a vertical face 13a of a shaft 13 and a vertical face 14a of a housing 14. The shaft 13 and the housing 14 rotate relative to one another. For example, the shaft 13 is provided with a circular race rest 15 which engages the cylindrical portion 6 of the inner race 1 of the thrust roller bearing A. The back of the race body 5 of the inner race 1 rests against the vertical face 13a of the shaft 13. The back of the race body 8 of the outer race 2 rests against the vertical face 14a of the housing 14.

As an example, the thrust roller bearing A can be used in an automatic transmission as illustrated in FIG. 7. In such an example, the shaft 13 and the housing 14 may be separated from each other in the direction of their axes. Therefore, a load may or may not be applied on the thrust roller bearing A interposed between the shaft 13 and the housing 14.

When the shaft 13 is separated from the housing 14 in the direction of their axes and the load is not applied on the thrust roller bearing A, the thrust roller bearing A is removed from the race rest 15 of the shaft 13 with the thrust roller bearing A being close to the housing 14 and, finally, the bearing A detaches from the shaft 13 and the housing 14 as illustrated in FIG. 8. This is caused by coherency of a lubricant interposed between the vertical face 14a of the housing 14 and the back of the outer race 2 of the thrust roller bearing A.

SUMMARY OF THE INVENTION

Accordingly, it is an object of the present invention to provide an improved fixing structure for a thrust roller bearing which may not be removed from a shaft and a housing.

It is another object of the present invention to provide an improved fixing structure of a thrust roller bearing whose race is kept in a stationary condition in connection with either a shaft or a housing which rotate relative to one another, so that the thrust roller bearing is prevented from detaching.

Yet another object of the present invention is to provide a fixing structure for a thrust roller bearing which will support the bearing in a plurality of positions to thereby hold the bearing stable.

Still another object of the present invention is to provide a fixing structure for a thrust roller bearing which has a spacer piece to permit adjustments of the width of the recess to thereby enable use of bearings having different sizes.

Briefly described, these and other objects of the present invention are fulfilled by providing a structure for fixing a thrust roller bearing interposed between two elements which rotate relative to one another which comprises race rest means provided at either of the two elements for supporting the thrust roller bearing in an unmoved state in the direction of the axes of the two elements, and projection means provided at the inner periphery of an inner race of the thrust roller bearing or the outer periphery of an outer race of the thrust roller bearing. The race rest means has a recess by which the projection means is locked so as to prevent the race with the projection means from detaching from the first elements.

These and other objects are also fulfilled by providing a structure for fixing a thrust roller bearing comprising an inner race, an outer race, a plurality of rollers disposed between the races and a retainer for the rollers. The inner race and outer race will each have a cylindrical portion which extends axially toward the opposite race and these cylindrical portions will hold the retainer therebetween. Race rest means are provided on one of the two elements for supporting the thrust roller bearing in a generally fixed position relative to the axes of the two elements. The race rest means will have a plurality of rest faces for engaging the inner race or outer race at a plurality of positions to thereby hold this race stably. The race rest means will also have a cylindrical face which is generally perpendicular to the rest face. The structure also comprises at least one recess defined in one of the elements and a projection means which will extend into this at least one recess. The projection means will prevent the one element from separating from the thrust roller bearing.

Moreover, these and other objects of the instant invention are provided by a structure for fixing a thrust roller bearing interposed between two elements which each have an axis and which are rotatable relative to one another, which structure comprises an inner race, an outer race, and a plurality of rollers disposed between the races and a retainer for said rollers. The inner race and outer race will each have a cylindrical portion which extends axially toward the opposite race and these cylindrical portions will hold the retainer therebetween. Race rest means are provided on one of the two elements for supporting the thrust roller bearing in a generally fixed position relative to the axes of said two elements. The race rest means has a rest face for engaging either the inner or outer race and the race rest means also has a cylindrical face which is generally perpendicular to said rest face. A recess is defined in one of the two elements which receives a projection of a projection means extending from either the inner race cylindrical portion or outer race cylindrical portion. The race having the projection means will be prevented from separating when the two elements attempt to separate by this projection means. A spacer means is also provided for decreasing the width of the recess whereby thrust roller bearings having different sizes can be accommodated within the structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 12a is a cross-sectional view of the outer race for the fifth and sixth embodiments taken along line X'-X' of FIG. 12b;

FIG. 12b is a front view of the outer race for the fifth and sixth embodiments;

FIG. 13a is a front view of the inner race of the fifth and sixth embodiments; and FIG. 13b is a cross-sectional view of the inner race of the fifth and sixth embodiments taken along X''-X'' of FIG. 13a.

DESCRIPTION OF THE PREFERRED EMBODIMENTS

Figure 1:
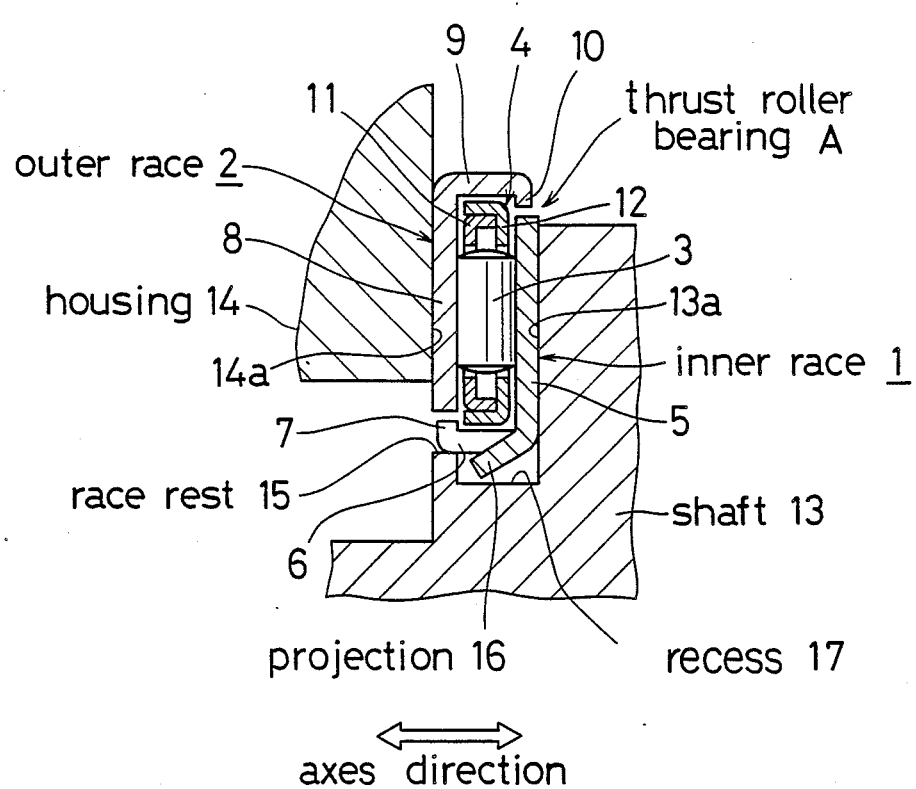
FIG. 1 is a cross-sectional view of an upper part of a first embodiment for fixing a thrust roller bearing according to the present invention.
Figure 9:
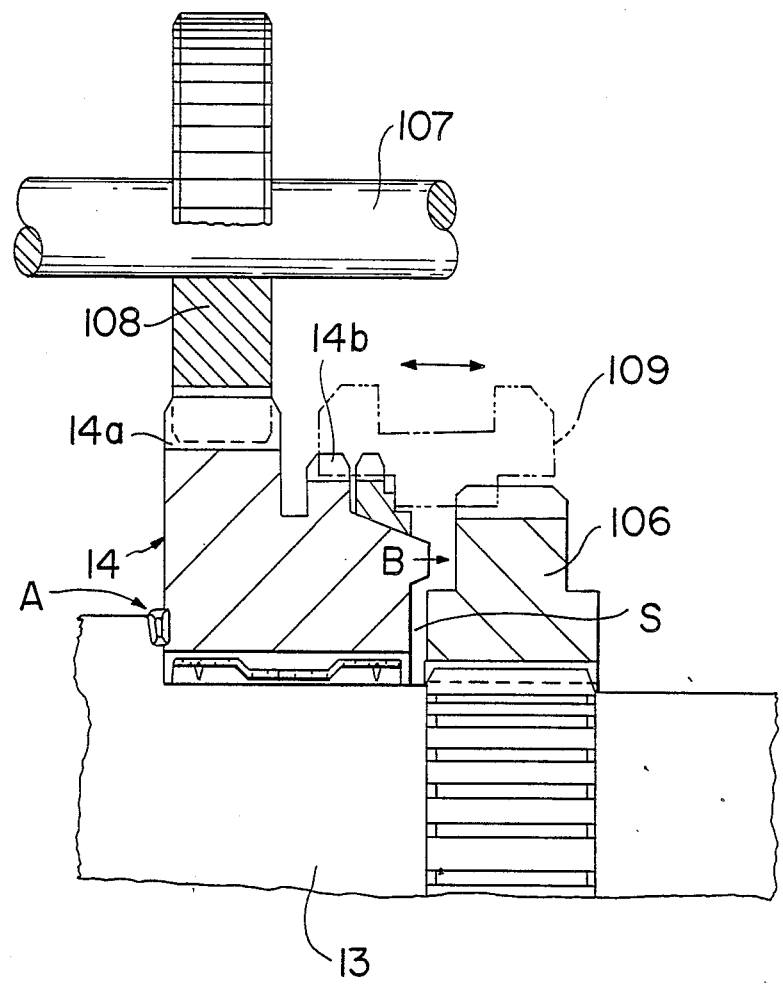
FIG. 9 is a cross-sectional view of a portion of a transmission having the thrust roller bearing of the present invention.

In FIG. 9, a cross-sectional view of a portion of a transmission having a thrust roller bearing A of the instant invention is shown. Power is transmitted from element 107 to the shaft 13. It should be noted that in this FIG. 9, like elements corresponding to those of FIG. 1 are denoted by like numerals. The power is transmitted to shaft 13 through elements 108, 14a, 14, 14b, 106. The housing 14 can move a little axially relative to the shaft 13 due to the existence of space S as indicated by arrow B.

Figure 7:
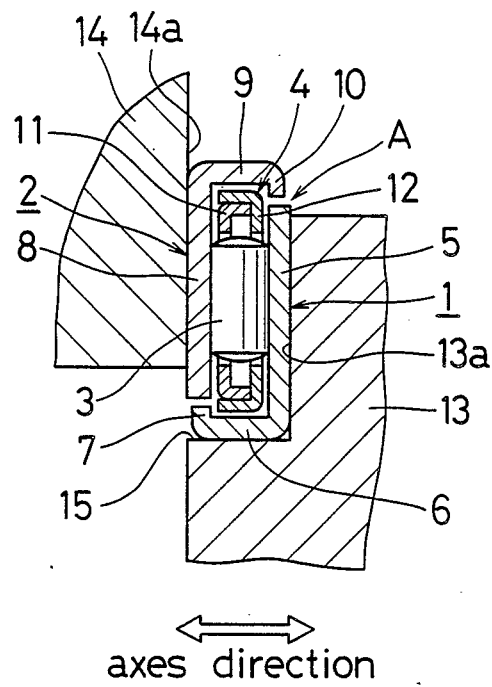
FIG. 7 is a cross-sectional view of an upper part of a structure for fixing a conventional thrust roller bearing.
Figure 8:
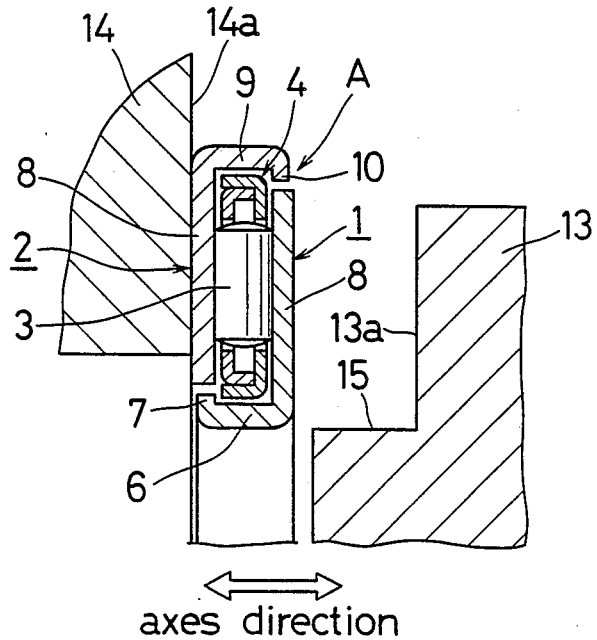
FIG. 8 is a cross-sectional view of an upper part of a structure for fixing a conventional thrust roller bearing after the bearing detaches from the shaft.

The first embodiment of the instant invention will now be described with reference to FIGS. 1 and 2. Again, like elements corresponding to those of FIG. 7 are denoted by like numerals.

According to the first preferred embodiment of the present invention, the cylindrical portion 6 of the inner race 1 is provided with a projection means having a projection 16 extending toward the center of the cylindrical portion 6. The projection 16 is positioned in recess 17 of the shaft 13 while the projection 16 is engaged with the circular race rest 15 of the shaft 13, so that the cylinder 6 is prevented from coming off.

Figure 2:
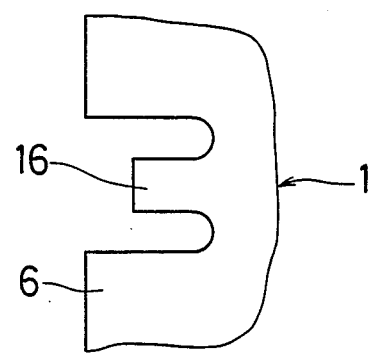
FIG. 2 is a plan view of a cylindrical portion used for the first preferred embodiment of the present invention.

More particulary, as shown in FIG. 2, the projection 16 is formed by punching out three points of the periphery of the cylindrical portion 6. The projection 16 is bent from its base to its tip to taper toward the center of the cylindrical portion 6. The projection 16 is arranged around the periphery of the cylindrical portion 6, for example, at three positions having an angle therebetween of 120°. A "U"-shaped curve is provided at the base portion of the projection 16 to prevent cracking.

In the first preferred embodiment of the present invention, the recess 17 is a circular groove formed between the side of the vertical face 13a and the race rest 15.

The radius between the bottom of the recess 17 and the center of the axis of the shaft 13 is set a little smaller than the radius between the tip of the projection 16 and the center of the axis of the inner race 1. The inner race 1 can thereby move slightly with respect to the race rest 15 in the direction of the radius. Further, the length of the recess 17 in the axial direction of the bearing is set so that the projection 16 can move a little within the recess 17 in the axial direction of the bearing.

To attach the inner race 1 to the race rest 15, the projection 16 is elastically deformed toward the outer periphery of the bearing and once it falls within the recess 17, it elastically returns toward the inner periphery of the bearing. Even if the inner race 1 was removed from the race rest 15, the projection 16 would be prevented from coming off because the tip of the projection 16 is locked by the inner wall of the recess 17.

Since the projection 16 is formed by cutting the inner race 1 as shown in FIG. 2 and raising the remaining portion during the stamping operation of the inner race 1, the projection 16 is flexible. To improve the elasticity of the projection 16, the projection 16 may be tempered after heat treatment or may be heat treated after tempering or after an additional film is coated on the projection 16.

According to the first preferred embodiment of the present invention, even if the shaft 13 and the housing are separated from each other in the axial direction of the bearing, the thrust roller bearing A is prevented from detaching from the race rest 15 of the shaft 13 because the projection 16 of the inner race 1 is locked by the recess 17 of the race rest 15.

When the thrust roller bearing A is attached on the race rest 15 of the rest 13, the projection 16 fits loosely within the recess 17, so that the thrust roller bearing A can move somewhat freely in the axial and radial directions thereof in connection with the race rest 15. Therefore, a lubricant may be introduced between the back of the inner race 1 and the vertical face 13a of the shaft 13, so as to prevent this portion from being burned.

Further, in the first preferred embodiment of the present invention, the projection 16 is bent obliquely, so that the direction of the attachment of the projection 16 with respect to the race rest 15 is automatically determined. Therefore, erroneous attachment of the thrust roller bearing A to the race rest 15 is prevented.

Figure 3:
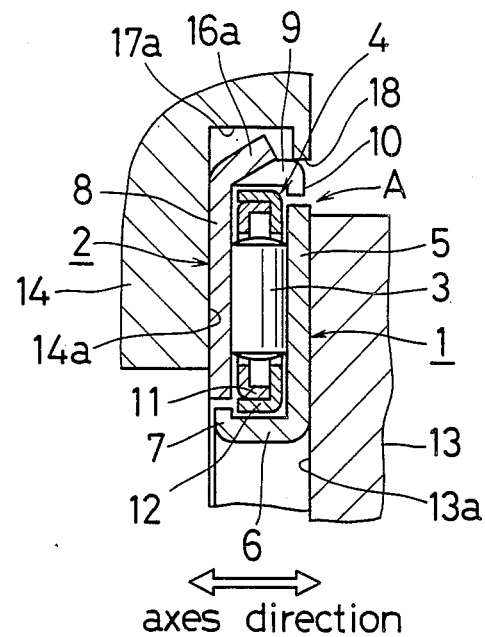
FIG. 3 is a cross-sectional view of an upper part of a second embodiment for fixing a thrust roller bearing according to the present invention.

FIG. 3 shows a fixing structure according to the second preferred embodiment of the present invention. Like elements corresponding to those of FIG. 1 are denoted by like numerals.

In the second preferred embodiment of the present invention, the cylindrical portion 9 of the outer race 2 is provided with a projection 16a while the housing 14 is provided with a race rest 18, so that the race rest 18 has a recess 17a with which the projection 16a is locked.

The projection 16a and the recess 17a are basically identical with the projection 16 and the recess 17, respectively, as explained in the first preferred embodiment of the present invention. The projection 16a should be projected radially outwardly from the cylindrical portion 9 of the outer race 2.

Even if the shaft 13 and the housing 14 are separated from each other in the axial direction of the bearing, the thrust roller bearing A is prevented from coming off from the race rest 18 of the housing 14 because the projection 16a of the outer race 2 is locked by the recess 17a of the race rest 18.

Figure 4:
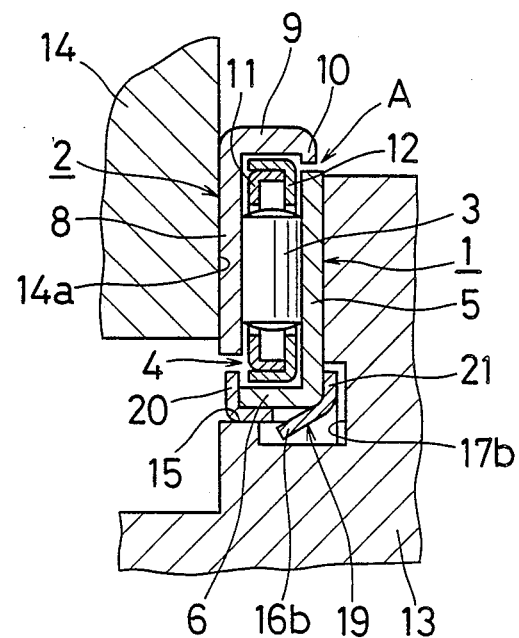
FIG. 4 is a cross-sectional view of an upper part of a third embodiment for fixing a thrust roller bearing according to the present invention.
Figure 5:
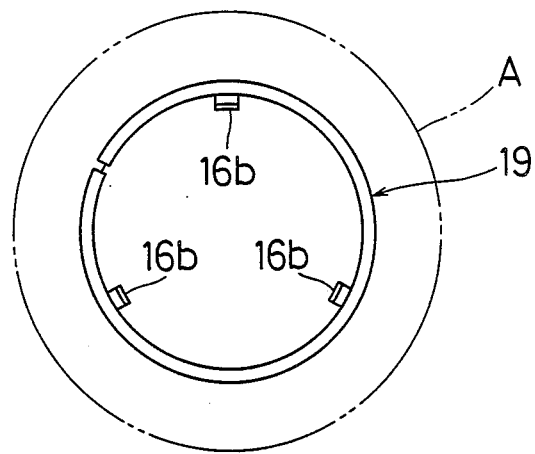
FIG. 5 is a plan view of a ring used for at least the third preferred embodiment of the present invention.

FIGS. 4 and 5 show a fixing structure according to the third preferred embodiment of the present invention. Like elements corresponding to those of FIG. 1 are denoted by like numerals.

In this preferred embodiment of the present invention, the cylindrical portion 6 at the inner periphery of the inner race 1 is provided with a cup-shape ring 19 having some projections 16b similar to the projection 16 of the first preferred embodiment of the present invention. Recess 17b has an L-shape in its sectional view and is provided from the race rest 15 of the shaft 13 to the vertical face 13a of the shaft 13.

FIG. 5 shows the ring 19. The circle of the ring 19 is cut at one point of the periphery thereof, so that it can be easily attached to the inner race 1. After the ring 19 is attached to the cylindrical portion 6 of the inner race 1, annular flanges 20 and 21 of the ring 19 are caulked. In this referred embodiment of the present invention, the annular flange 20 of the ring 19 causes the inner race 1 and the retainer 4 to be incapable of being separated. The annular projection 7 of the inner race 1 can be eliminated. Preferably, the ring 19 can be made of steel or a synthetic resin whereby the ring 19 is both strong and elastic.

Similarly to the first preferred embodiment, in the third preferred embodiment of the present invention, the thrust roller bearing A cannot be separated from the race rest 15 of the shaft 13, even if the shaft 13 and the housing 14 are separated from each other in the axial direction of the bearing. Such separation is prevented by the projection 16b of the ring 19 being locked by the recess 17b of the race rest 15 of the shaft 13.

Figure 6:
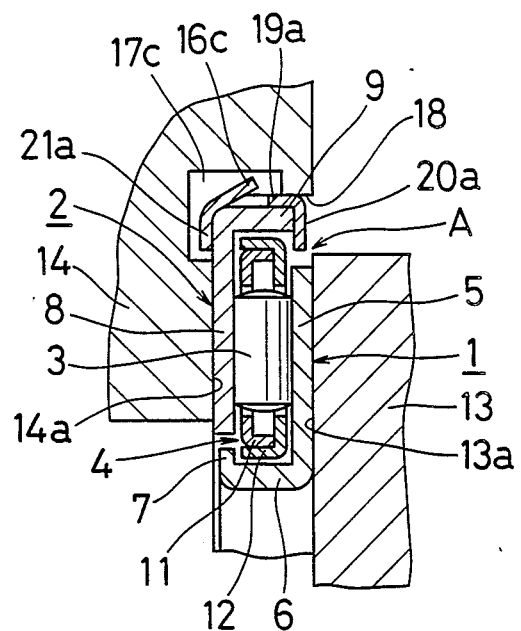
FIG. 6 is a cross-sectional view of an upper part of a fourth embodiment for fixing a thrust roller bearing according to the present invention.

FIG. 6 shows a fixing structure according to the fourth preferred embodiment of the present invention. Like elements corresponding to those of FIG. 4 are denoted by like numerals.

In this preferred embodiment of the present invention, the cylindrical portion 9 positioned at the outer periphery of the outer race 2 is provided with a ring 19a having some projections 16c similar to the projections 16 in the second preferred embodiment of the present invention, while an L-shaped recess 17c is provided from the race rest 18 of the housing 14 to the vertical face 14a of the housing 14.

In the fourth preferred embodiment similar to the second preferred embodiment of the present invention, even if the shaft 13 and the housing 14 are separated from each other in the axial direction of the bearing, the thrust roller bearing A is prevented from detaching from the race rest 18 of the housing 14 because the projection 16c of the ring 19a is locked by the recess 17c of the race rest 18 of the housing 14.

Figure 10:
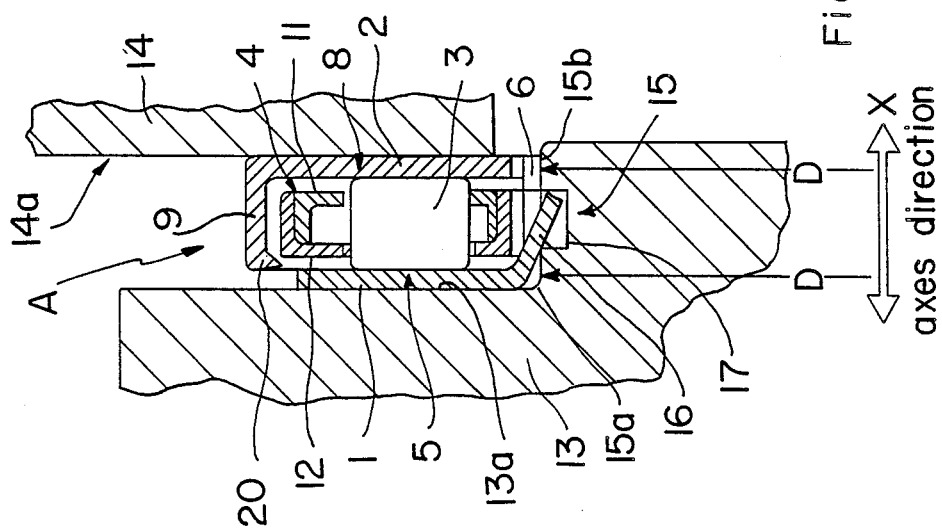
FIG. 10 is a cross-sectional view of an upper part of a fifth embodiment for fixing a thrust roller bearing of the present invention.

FIG. 10 shows a fixing structure according to the fifth preferred embodiment of the present invention. Like elements corresponding to those of FIG. 1 are denoted by like numerals.

In this preferred embodiment, the race rest or race rest means 15 comprises a first rest face 15a and second rest face 15b. The recess 17 is located generally in the middle of the two rest faces 15a and 15b. This recess 17 continues to receive the projection means or projection 16. The first race rest face 15a and second race rest face 15b are located equal distances D from the axes X of rotation of the shaft (first element) 13 and housing (second element) 14.

Provision of the first rest face 15a and second race face 15b enables the inner race cylindrical portion 6 to be engaged at least at two positions. Thus, the mounted thrust roller bearing A can be supported at two positions and operation of the thrust roller bearing A will be stable because it is securely held. Similarly to the other embodiments, the provision of the projection 16 and recess 17 prevents separation of the shaft (first element) 13 and housing (second element) 14 as well as prevents the first roller bearing A from detaching from the race rest means of shaft 13.

While the shaft (first element) 13 has been shown in FIG. 10 as having the first rest face 15a and second rest face 15b as well as recess 17, it should be understood that the housing (second element) 14 could have the two rest faces and the recess similarly to the embodiment shown in FIG. 3, for example. Such an arrangement would include the two rest faces 15a and 15b on housing 14 whereby the thrust roller bearing A would continue to be stably supported by two contact positions with the race rest means 15. Likewise, the thrust roller bearing A shown in FIG. 10 could also include a cup-shaped ring 19 or 19A as shown in FIGS. 4 and 6, respectively.

This fifth embodiment uses a plurality of ribs 20 on an end of the inner and outer race cylindrical portions 6 and 9 for the inner race 1 and outer race 2, respectively. In FIG. 10, only the ribs at the end of the outer race cylindrical portion 9 are shown.

In FIGS. 12a and 12b, the outer race 2 is shown with a plurality of ribs 20 extending around the outer end of the outer race cylindrical portion 9. In FIGS. 13a and 13b, the inner race 1 is shown with a plurality of ribs 20 on the end of the inner race cylindrical portion 6. Also seen in FIGS. 13a and 13b are the projection or projection means 16. As will be apparent from FIGS. 12a through 13b, only the upper portion of the inner and outer races are shown in the foregoing drawings.

These ribs 20 on the inner and outer race cylindrical portions 6, 9, respectively, function similarly to the circular projections 7 and 10 as shown in FIG. 1, for example. The ribs 20 will prevent detachment of the retainer 4.

Similarly to the first through fourth embodiments, the fifth embodiment shown in FIG. 10 discloses the vertical face or cylindrical face 13a of the race rest means being generally parallel to the side or vertical face 14a of the housing 14. This side or vertical face 14a of the housing 14 will contact the outer race 2.

Figure 11:
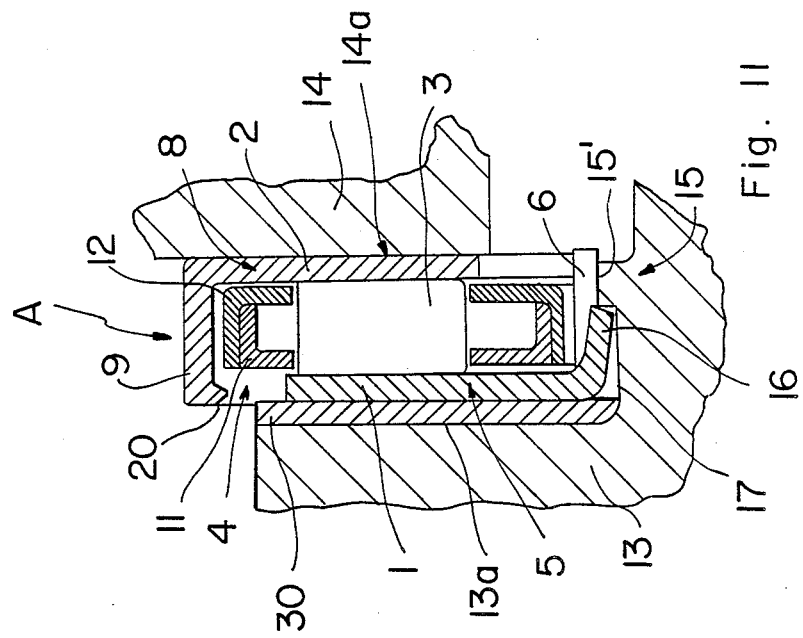
FIG. 11 is a cross-sectional view of an upper part of a sixth embodiment for fixing a thrust roller bearing of the present invention.

Referring now to FIG. 11, a fixing structure according to a sixth preferred embodiment of the present invention is shown. Like elements corresponding to those of FIG. 1 are denoted by like numerals.

In this preferred sixth embodiment of the instant invention, a spacer means 30 is provided between the vertical face or cylindrical face 13a of the race rest means 15 and the inner race 1. This spacer extends into the recess 17 and thereby reduces the width of this recess. By using spacer means 30 having different widths, various sized thrust roller bearings A can be mounted between the shaft (first element) 13 and housing (second element) 14. Thus, regardless of the width of the recess, various thrust roller bearings can be utilized. It should be recognized that the various components of the thrust roller bearings which are used simultaneously will be all of the same size. Nonetheless, a thrust roller bearing assembly having a first size can be used with a spacer having a first width and a second thrust roller bearing assembly having a second size can be used with a second spacer having a second width. These first and second sizes and widths are different such that different sized thrust roller bearings can be accommodated. Therefore, the width of the recess 17 can be adjusted as necessary.

The spacer means 30 shown in FIG. 11 is a generally solid element, but it should be recognized that any form of spacer can be used. It is merely important that the inner race 1 be stably held.

This sixth embodiment also uses a plurality of ribs 20 similar to the fifth embodiment shown in FIG. 10. While FIG. 11 only shows a rib 20 on the outer race cylindrical portion 9, it should be understood that the inner race cylindrical portion 6 also has such ribs. These ribs 20 have been discussed with reference to FIGS. 12a, 12b, 13a and 13b above.

It should also be recognized that while the shaft (first element) 13 has the recess 17 and receives the projection means for projection 16 in this sixth embodiment, it could be the housing (second element) 14 which has these elements similarly to the second embodiment of the invention shown in FIG. 3. Likewise, a ring 19 or 19a could be used in the sixth embodiment as shown in the third and fourth embodiments of FIGS. 4 and 6, respectively.

It is possible in the respective preferred embodiments of the present invention that the recesses 17, 17a, 17b and 17c are arranged at a plurality of positions at certain intervals along the circumference of the shaft or housing. Further, a continuous groove can be provided along the circumference of the shaft or housing. Moreover, the shape of the projections 16, 16a, 16b and 16c should not be limited to the above description.

In the above preferred embodiments of the present invention, the thrust roller bearing A is described as a type for not being separated; however, the bearing A should not be limited to such a type. For example, the thrust roller bearing A can be used in a retainer which is not to be separated from either of the races 1 and 2.

As described above, in accordance with the present invention, a projection at the inner periphery of an inner race or at the outer periphery of an outer race is locked by a recess formed at a race rest, so that a thrust roller bearing is safely connected with a race rest of either a shaft or a housing. Therefore, even if the shaft and the housing rotating relative to one another are separated from each other in the axial direction of the bearing, the thrust roller bearing is prevented from detaching from the race rest of either the shaft or the housing.

The invention being thus described, it will be obvious that the same may be varied in many ways. Such variations are not to be regarded as a departure from the spirit and scope of the invention, and all such modifications are intended to be included within the scope of the following claims.

I claim:

1. A structure for fixing a thrust roller bearing interposed between two elements which each have an axis and which are rotatable relative to one another, the structure comprising:

an inner race;

an outer race;

a plurality of rollers disposed between said races and a retainer for said rollers;

an inner race cylindrical portion on said inner race which extends axially toward said outer race;

an outer race cylindrical portion on said outer race which extends axially toward said inner race;

said inner race cylindrical portion and said outer race cylindrical portion holding the retainer therebetween;

race rest means provided on a first one of said two elements for supporting the thrust roller bearing in a generally fixed position relative to the axes of said two elements, said race rest means having a plurality of rest faces for engaging one of said inner race and said outer race at a plurality of positions to thereby hold said one of said inner race and said outer race stably, and said race rest means having a cylindrical face which is generally perpendicular to said plurality of rest faces, at least one of said rest faces being positioned farther from the cylindrical face of the race rest means than another one of said rest faces, the another one of said rest faces being adjacent the cylindrical face;

at least one recess having wall portions defined in said first of said two elements between said plurality of race rest faces; and projection means extending from one of the inner race cylindrical portion and outer race cylindrical portion into said at least one recess for engaging at least one of the wall portions when said two elements attempt to separate to prevent detachment of the race having the projection means with the first one of said two elements from the first element.

2. The structure as recited in claim 1, wherein said plurality of rest faces comprises a first and second rest face, the first race face being adjacent the cylindrical face of the race rest means and the second rest face being adjacent an end of the cylindrical portion of the one inner race and outer race engaged thereby.

3. The structure as recited in claim 2, wherein the at least one recess is positioned substantially midway between said first and second rest faces.

4. The structure as recited in claim 1, wherein the at least one recess is positioned substantially midway between said plurality of rest faces.

5. The structure as recited in claim 1, wherein said plurality of rest faces are positioned generally equidistantly from said axis of the first element.

6. The structure as recited in claim 1, further comprising a plurality of ribs at an end of said inner race cylindrical portion and a plurality of ribs at an end of said outer race cylindrical portion, all of said ribs aiding in holding said retainer.

7. The structure as recited in claim 1, wherein said first element is a shaft and the second element is a housing, said race rest means and said at least one recess being provided on the shaft, said inner race being adjacent said cylindrical face of said race rest means and said outer race being adjacent said housing and contacting a side thereof, said side of the housing in contact with the outer race and said cylindrical face of said race rest means being generally parallel.

8. The structure as recited in claim 1, wherein the projection means comprises a plurality of projections provided along the circumference of said one of the inner race cylindrical portion and the outer race cylindrical portion.

9. The structure as recited in claim 1, wherein the projection means comprises a ring which surrounds said one of the inner race cylindrical portion and the outer race cylindrical portion.

10. The structure as recited in claim 1, wherein the projection means comprises at least one projection which tapers from an edge of the inner race cylindrical portion.

11. The structure as recited in claim 1, wherein the at least one recess is a single, generally circular groove.

12. A structure for fixing a thrust roller bearing interposed between two elements which each have an axis and which are rotatable relative to one another, the structure comprising:
   an inner race;
   an outer race;
   a plurality of rollers disposed between said races and a retainer for said rollers;
   an inner race cylindrical portion on said inner race which extends axially toward said outer race;
   an outer race cylindrical portion on said outer race which extends axially toward said inner race;
   said inner race cylindrical portion and said outer race cylindrical portion holding the retainer therebetween;
   race rest means provided on one of said two elements for supporting the thrust roller bearing in a generally fixed position relative to the axes of said two elements, said race rest means having a rest face for engaging one of said inner race and said outer race, and said race rest means having a cylindrical face which is generally perpendicular to said rest face;
   a recess defined in said one of said two elements by said race rest means, said recess having a given width;
   projection means extending from one of the inner race cylindrical portion and an outer race cylindrical portion into said recess for engaging the cylindrical face of the race rest means when said two elements attempt to separate to prevent the race having the projection means from coming off; and
   spacer means for decreasing the width of the recess whereby thrust roller bearings having different sizes can be fixed by the structure.

13. The structure as recited in claim 12, wherein the spacer means is positioned between and in contact with the inner race and the cylindrical face of the race rest means whereby said inner race fails to contact the cylindrical face.

14. The structure as recited in claim 12, wherein the spacer means comprises a spacer positioned between the inner race and the cylindrical face of the race rest means, said spacer, inner race and projection means having a given width that is slightly less than or equal to the given width of the recess.

15. The structure as recited in claim 14, wherein the spacer is a generally solid element and the width thereof is fixed.

16. The structure as recited in claim 12, wherein the recess extends to the cylindrical face of the race rest means and the projection means includes at least one projection, the projection and spacer means both extend into the recess.

17. The structure as recited in claim 12, further comprising a plurality of ribs at an end of said inner race cylindrical portion and a plurality of ribs at an end of said outer race cylindrical portion, all of said ribs aiding in holding said retainer.

18. The structure as recited in claim 12 wherein said one of said two elements having the race rest means is a shaft and the other of said two elements is a housing, said housing having a side contacting said outer race, said side of the housing and said cylindrical face of said race rest means being generally parallel.

19. The structure as recited in claim 12, wherein the projection means comprises a plurality of projections provided along the circumference of said one of the inner race cylindrical portion and the outer race cylindrical portion.

20. The structure as recited in claim 12, wherein the projection means comprises a ring which surrounds said one of the inner race cylindrical portion and the outer race cylindrical portion.

21. The structure as recited in claim 12, wherein the projection means comprises at least one projection which tapers from an edge of the inner race cylindrical portion.

22. The structure as recited in claim 12, wherein the recess is a single, generally circular groove.

* * * * *